Sept. 27, 1966 A. W. KNOX 3,274,685
CUTTING APPLIANCES
Filed Aug. 12, 1963
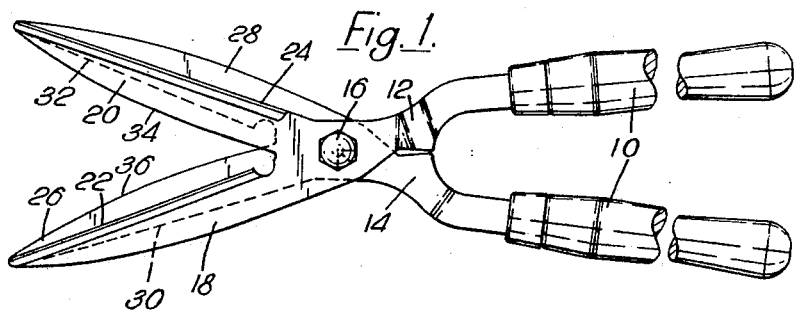
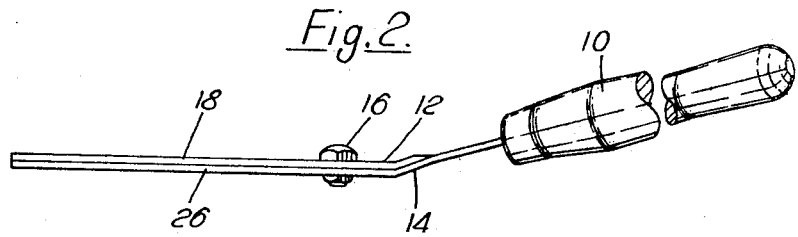
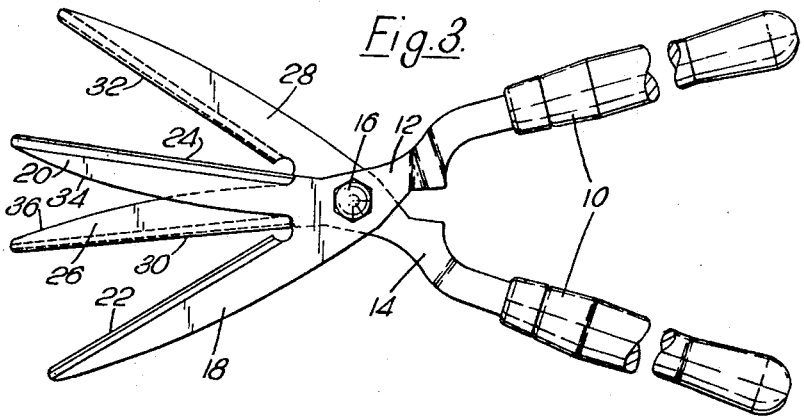
Inventor
Arthur William Knox
By Dowell & Dowell
Attorneys

United States Patent Office 3,274,685
Patented Sept. 27, 1966

3,274,685
CUTTING APPLIANCES
Arthur William Knox, Longford, West Drayton, England, assignor to Mitchel & King Limited, Slough, England
Filed Aug. 12, 1963, Ser. No. 301,253
Claims priority, application Great Britain, Aug. 16, 1962, 31,418/62
2 Claims. (Cl. 30—211)

This invention relates to cutting tools and is particularly concerned with gardening shears.

Gardening shears generally comprise a pair of handles having a cutting blade attached to each handle, the two blades being pivoted together in the region of their stems or base portions. In contrast to this, shears or other cutting tools in accordance with the present invention have three or more cutting blades with at least two blades extending from a single stem.

Preferably the shears have four cutting blades so that the two blade stems each have two blades. In this way the cutting edges of the blades on one stem make cutting contact during use of the shears with the respective cutting edges of the blades on the other stem.

By way of example, a specific pair of gardening shears in accordance with the invention is shown in the accompanying drawing, in which:

FIGURE 1 is a plan view of the shears with the blades in their closed position;

FIGURE 2 is a side view of the shears; and

FIGURE 3 is another plan view showing the blades of the shears in their open position.

The shears illustrated comprise a pair of wooden handles 10 to each of which is connected a metal stem 12, 14, the stems being pivoted together at 16. Each stem carries a pair of cutting blades splayed apart in the form of a V, the stem 12 having two cutting blades 18 and 20 provided with cutting edges 22 and 24, and the stem 14 having two similar blades 26 and 28 provided with cutting edges 30 and 32. The blades 18, 20, 26 and 28 are made of tool steel, which can be a stainless steel if desired, and are hollow-ground in the region of their cutting edges. The blades shown in the drawing are integral with their respective stems 12, 14, but it is possible for the blades to be securely fastened to the stems by screws or other fixing means so that the blades can be removed and replaced where necessary. As shown in FIGURE 2, one pair of blades 18 and 20 lies on top of the other pair of blades 26 and 28.

FIGURE 3 shows the blades in their open position, blades 18 and 28 being outer blades. It will be seen from this figure that, when the handles are brought together into the position which they have in FIGURE 1, the cutting edge 22 on the blade 18 will make a shearing cut with the cutting edge 30 on the blade 26, while the cutting edge 24 on the blade 20 will make a shearing cut with the cutting edge 32 on the blade 28. If the handles are opened still wider before being brought together, additional cutting is obtained between the edges 24 and 30 as the blades 20 and 26 cross each other. Thus the cutting effect obtainable is treble that of the usual form of shears having only two blades.

A number of modifications may be made to the shears described above. Thus, the edges 34 and 36 on the blades 20 and 26 can also be sharpened as cutting edges so that further cutting is achieved as these two edges pass over each other. Further, the cutting edges 22, 24, 30 and 32 on the blades need not be of the simple form shown in the accompanying drawing but can be of wavy or serrated form so as to be better able to deal with, say, the twigs of hedges.

In most instances it will be best for four cutting blades to be provided, two on each stem 12, 14. However, it is entirely possible for more than four blades to be provided. For example, each stem 12, 14 can have three or four blades, thus making six or eight blades in all. Normally each stem should have the same number of blades as the other stem, but this is not absolutely essential, and there may even be occasions when three-bladed shears are suitable, one blade being carried on one stem and two blades on the other stem. In this instance the blade which is alone on one of the stems will have a cutting edge along both of its side edges.

It has been established that the multi-blade cutting tool of the invention has a superior cutting action to the usual form of cutting tool having only two blades. Special emphasis has been laid above on the application of the invention to gardening shears, but it is also applicable to other cutting tools such as pruners and scissors. Nor is the invention restricted to hand-operated tools, as it can also be applied with benefit to power-operated cutting tools.

I claim:

1. Hedge trimming shears comprising two stems joined together by a pivotal connection, each stem carrying inner and outer cutting blades which are splayed apart to form an acute angle on one side of the pivotal connection, said stems also carrying handles extending on the opposite side of the pivotal connection, the outer blade of each stem extending in substantial alignment with its corresponding handle, an open position of the blades having both blades on one stem disposed to one side of both blades of the other stem wherein none of the blades overlap any other blade, and the cutting edges of the blades of one stem facing the cutting edges of the blades of the other stem, whereby on closing the stems three cuts are obtained.

2. Hedge shears as set forth in claim 1, in which one of the blades of each stem is formed with a cutting edge along each of its side edges.

References Cited by the Examiner
UNITED STATES PATENTS

| 136,209 | 2/1873 | Borden | 30—211 |
| 664,870 | 1/1901 | Juritsch | 30—211 |
| 1,993,360 | 3/1935 | Ciocia | 30—211 |

WILLIAM FELDMAN, Primary Examiner.
MILTON S. MEHR, Examiner.
J. C. PETERS, Assistant Examiner.